United States Patent [19]
Tamura

[11] Patent Number: 6,084,939
[45] Date of Patent: Jul. 4, 2000

[54] IMAGE PROCESSING APPARATUS AND METHOD

[75] Inventor: Toshikazu Tamura, Utsunomiya, Japan

[73] Assignee: Canon Kabushiki Kaisha, Tokyo, Japan

[21] Appl. No.: 08/976,233

[22] Filed: Nov. 21, 1997

[30] Foreign Application Priority Data

Nov. 26, 1996  [JP]  Japan .................................. 8-314512

[51] Int. Cl.[7] .................................................. H05G 1/64
[52] U.S. Cl. ......................... 378/98.2; 378/62; 378/98.8
[58] Field of Search ............................. 378/62, 98, 98.2, 378/98.3, 98.5, 98.8

[56] References Cited

U.S. PATENT DOCUMENTS

| | | | |
|---|---|---|---|
| 4,383,327 | 5/1983 | Kruger | 378/19 |
| 4,458,267 | 7/1984 | Dolazza | 378/98.7 |
| 4,730,212 | 3/1988 | Wojcik et al. | 348/61 |
| 4,748,511 | 5/1988 | Nichols et al. | 358/433 |
| 5,041,729 | 8/1991 | Takahashi et al. | 250/370.11 |
| 5,706,290 | 1/1998 | Shaw et al. | 370/465 |

FOREIGN PATENT DOCUMENTS

97/01089  1/1997  WIPO .

*Primary Examiner*—David V. Bruce
*Attorney, Agent, or Firm*—Fitzpatrick, Cella, Harper & Scinto

[57] ABSTRACT

An image processing apparatus is constructed of an irradiating unit for irradiating a energetic ray to an object to be examined, a detecting unit constructed of 2-dimensional image pickup devices for converting a transmission image transmitted through the object into an optical image and picking up the optical image, a driving unit for driving the 2-dimensional image pickup devices of the detecting unit in an n-row (n is a natural number) interlaced scan, and an image display unit for displaying image data obtained by the driving of the driving unit, wherein the image display unit has a first display mode for displaying an image for all the image data obtained by the driving of the driving unit and a second display mode for forming and displaying an image of one frame by using the image data of a plurality of frames obtained by the driving of the driving unit.

45 Claims, 8 Drawing Sheets

IMAGE PROCESSING APPARATUS AND METHOD

BACKGROUND OF THE INVENTION

1. Field of the Invention

The invention relates to an image processing apparatus and method and, more particularly, to an image processing of image data picked up by an X-ray image pickup apparatus.

2. Related Background Art

In an ordinary X-ray image pickup apparatus, an X-ray beam is irradiated to an object (such as specimen) to be examined such as a medical patient from an X-ray source, for example, in an II (Image Intensifier)-TV system. An X-ray image obtained by the X-ray beam transmitted through the object is converted into a visible light image by an image multiplier or the like, and the visible light image is converted into a video signal by an ordinary video camera or the like. A corresponding video image is displayed on a monitor. At present, an image of a high resolution of (1000×1000) pixels or more can be displayed at a rate of 30 frames per second. A technique for converting a video signal into a digital signal in the II-TV system has already been put into practical use.

A solid-state X-ray image sensor of a high resolution has already been proposed. Such a sensor has a 2-dimensional array structure in which 3000 to 4000 detecting devices (for example, photodiodes) are arranged in the respective horizontal and vertical directions. Each detecting device forms an electric signal corresponding to a pixel luminance of an incident X-ray image. The electric signals of the detecting devices are individually read out and converted into digital signals. After that, the digital signals are image processed, stored, and displayed.

In such an image sensor of a high resolution, it is very difficult to fetch all of the pixel signals as moving images and to display all of the pixel signals from the viewpoint of processing speed. So long as only a still image can be derived at an inherent resolution, it cannot be said that a capability of the image sensor is sufficiently brought out.

Although the problem of the processing speed can be solved and a moving image display can be realized by sampling only partial pixels, there is a case where the user wants to observe a target portion as a still image of a high resolution. In the conventional apparatus, it takes a long time to switch from the moving image to the still image and it is fairly difficult to operate the apparatus so as to obtain the still image of the target portion while observing the object to be examined.

SUMMARY OF THE INVENTION

From the background as mentioned above, it is an object of the invention to provide an image processing apparatus and its method, in which an image of high resolution can be adaptively obtained from an image picked up by driving an image pickup device in an interlaced.

According to a preferred embodiment of the invention, the above object is accomplished by an image processing apparatus comprising: irradiating means for irradiating a radioactive ray to an object to be examined; detecting means constructed of 2-dimensional image pickup devices for converting a transmission image transmitted through the object into an optical image and picking up the optical image; driving means for driving the 2-dimensional image pickup devices of the detecting means in an n-row (n is a natural number) interlaced scan; and image display means for displaying image data obtained by the driving of the driving means, wherein the image display means has a first display mode for displaying an image for every image data obtained by the driving of the driving means and a second display mode for forming and displaying an image of one frame by using the image data of a plurality of frames obtained by the driving of the driving means.

According to another preferred embodiment of the invention, there is provided an image processing apparatus comprising: image pickup means constructed of 2-dimensional image pickup devices; driving means for driving the 2-dimensional image pickup devices of the image pickup means in an n-row (n is a natural number) interlaced scan; and display means for displaying an image signal picked up by the image pickup means, wherein the display means has a first display mode for displaying an image for every image data obtained by the driving of the driving means and a second display mode for forming and displaying an image of one frame by using the image data of a plurality of frames obtained by the driving of the driving means.

According to still another preferred embodiment of the invention, there is provided an image processing apparatus comprising: image pickup means for converting a radioactive ray transmitted through an object to be examined into an optical image and picking up the optical image using 2-dimensional image pickup devices; and display means for displaying image data picked up by the image pickup means, wherein pixel data of the 2-dimensional image pickup devices is read out by an n-row (n is a natural number) interlaced scan and the display means has a first display mode for displaying an image for every image data read out from the 2-dimensional image pickup devices by the n-row interlaced scan and a second display mode for forming and displaying an image of one frame by using a plurality of frames from the image data read out from the 2-dimensional image pickup devices by the n-row interlaced scan.

According to yet another embodiment, there is provided an image processing method of reading out and displaying image signals picked up by radioactive ray 2-dimensional image pickup devices, comprising: a reading step of reading out the image signals from the image pickup devices driven in an n-row (n is a natural number) interlaced scan a first display step of displaying an image for every image signal read out by the reading step; and a second display step of forming an image signal of one frame from the image signals of a plurality of continuous frames in the first display step and displaying an image.

According to another embodiment, there is provided an image processing method of reading out and displaying image signals from radioactive ray 2-dimensional image pickup devices, comprising: a first reading step of reading out the image pickup devices every n rows (n is a natural number); a first display step of displaying an image for every image signal read out by the first reading step; a second reading step of reading out the image signals from the remaining image pickup devices in parallel with the first display step; and a second display step of forming and displaying one image by using the image signals read out by the first and second reading steps.

Other objects, features and advantages of the invention will become apparent from the following detailed description taken in conjunction with the accompanying drawings.

DETAILED DESCRIPTION OF THE PREFERRED EMBODIMENTS

An embodiment of the present invention will now be described in detail hereinbelow with reference to the drawings.

Figure 1:
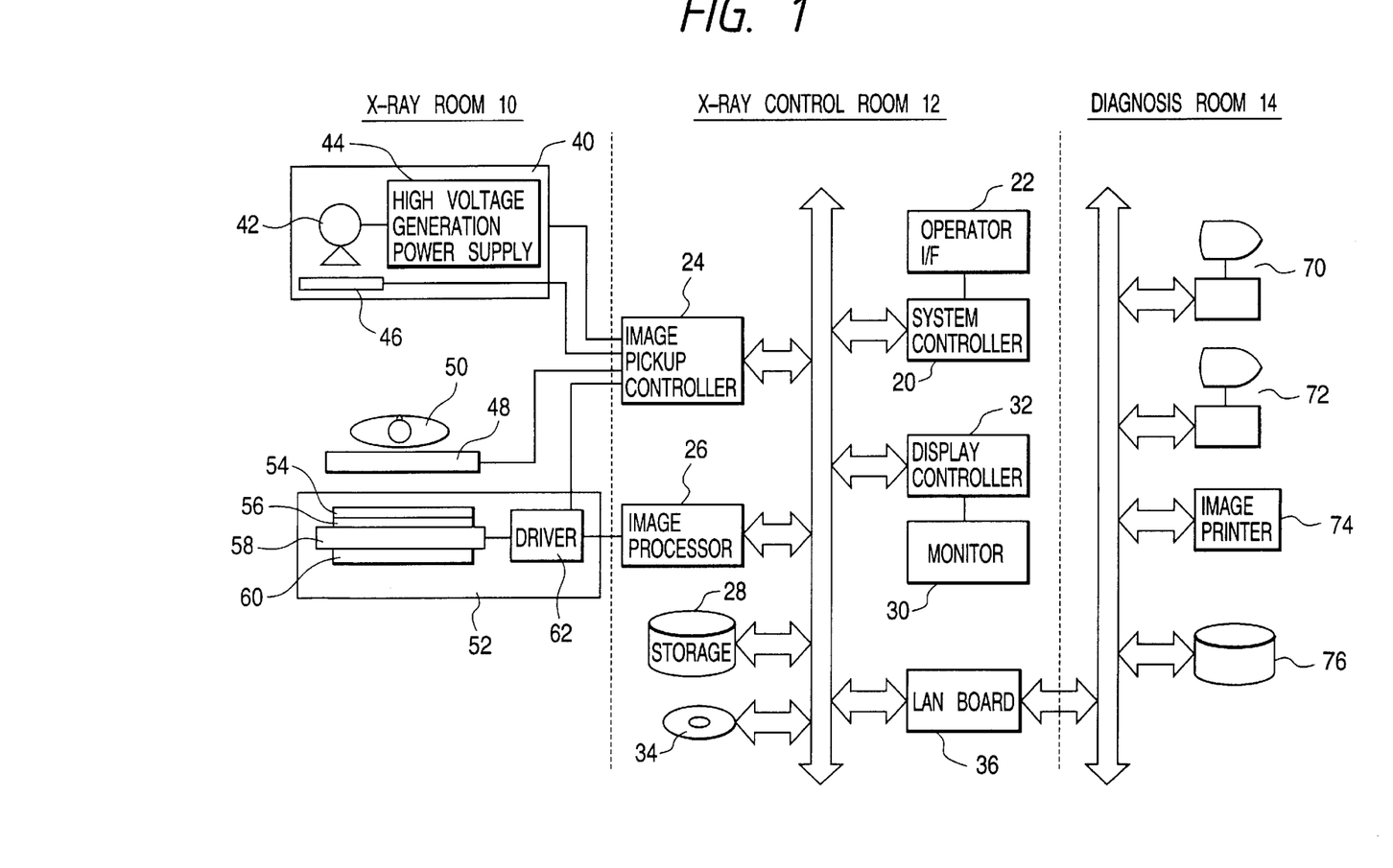
FIG. 1 is a block diagram of an X-ray image pickup system showing an embodiment of the invention.

FIG. 1 is a block diagram of an X-ray image pickup system showing an embodiment of the invention. Reference numeral 10 denotes an X-ray room; 12 an X-ray control room; and 14 a diagnosis room.

A system controller 20 that controls the whole operation of the X-ray image pickup system is arranged in the X-ray room 12. An operator interface 22 comprising a touch panel, a mouse, a keyboard, a joystick, a foot switch, and the like is used by an operator to input various instructions to the system controller 20. As instruction contents input by the operator, for instance, there are photographing conditions (still image/moving image, an X-ray vessel voltage, a vessel current, an X-ray irradiating time, etc.), a photographing timing, image processing conditions, an ID of an object to be examined, a processing method of a fetched image, and the like. An image pickup controller 24 controls an X-ray image pickup system which is disposed in the X-ray room 10. An image processor 26 processes an image picked up by the X-ray image pickup system in the X-ray room 10. As image processes which are executed in the image processor 26, for example, there are a correction of the image data, a space filtering, a recursive process, a gradation process, a scattered line correction, a dynamic range (DR) compressing process, and the like.

Reference numeral 28 denotes a storage device of a large capacity and a high speed for storing fundamental image data processed by the image processor 26. For example, the storage device 28 is made up of a hard disk array such as a Redundant Array of Inexpensive Disks (RAID) or the like. Reference numeral 30 denotes a monitor display (hereinafter, abbreviated to a monitor) to display a video image; 32 a display controller for controlling the monitor 30 and the displaying of various characters and images; 34 an external storage device (for example, magnetooptic disk) of a large capacity; and 36 a LAN board for connecting an apparatus in the X-ray control room 12 to an apparatus in the diagnosis room 14 and transferring photographed images or the like in the X-ray room 10 to the diagnosis room 14.

An X-ray generator 40 for generating an X-ray is disposed in the X-ray room 10. The X-ray generator 40 is constructed of: an X-ray vessel 42 for generating an X-ray; a high voltage generation power supply 44 which is controlled by the image pickup controller 24 and drives the X-ray vessel 42; and an X-ray diaphragm 46 for converging an X-ray beam generated by the X-ray vessel 42 into a desired image pickup region. A patient 50 as an object to be examined lies on a bed 48 for photographing. The photographing bed 48 is driven in accordance with a control signal from the image pickup controller 24 and can change the direction of the patient for the X-ray beam from the X-ray generator 40. An X-ray detector 52 for detecting the X-ray beam transmitted through the object 50 and photographing bed 48 is arranged under the photographing bed 48.

The X-ray detector 52 is constructed of: a laminate body comprising a grid 54, a scintillator 56, a photodetector array 58, and an X-ray exposure amount monitor 60; and a driver 62 for driving the photodetector array 58. The grid 54 is provided to reduce the effects of X-ray scattering that is caused when the X-ray beam transmits the object 50. The grid 54 is made up of a low X-ray absorbing material and a high absorbing material and has a stripe structure of, for example, Al and Pb. To prevent a moire interference pattern is not caused by the relation of grating ratios of the photodetector array 58 and grid 54, when the X-ray is irradiated, the X-ray detector 52 vibrates the grid 54 in accordance with a control signal from the image pickup controller 24.

In the scintillator 56, a host material of a fluorescent material is excited (absorbed) by the X-ray having a high energy and fluorescent light in a visible region is generated by a recombination energy. That is, the X-ray is converted to visible light. As fluorescent light, it is generated by the host itself, such as $CaWo_4$, $CdWo_4$, or the like, or a light emission center material added in the host such as CsI:T1, ZnS:Ag, or the like. The photodetector array 58 converts the visible light of the scintillator 56 into an electric signal.

The X-ray exposure amount monitor 60 is arranged for the purpose of monitoring an X-ray transmission amount. As an X-ray exposure amount monitor 60, the amount of X-ray can be directly detected by using a photosensitive device such as crystalline silicon or the like. The fluorescent light by the scintillator 56 can be also detected. In the embodiment, the X-ray exposure amount monitor 60, which is composed of an amorphous silicon photosensitive device formed as a film on the back surface of the board of the photodetector array 58, detects the visible light (which is proportional to the X-ray amount) transmitted through the photodetector array 58, and transmits information indicative of the light amount to the image pickup controller 24. The image pickup controller 24 controls the high voltage generation power supply 40 on the basis of the information from the X-ray exposure amount monitor 60, thereby adjusting the X-ray amount.

The driver 62 drives the photodetector array 58 under the control of the image pickup controller 24 and reads out the signal from each pixel. The operations of the photodetector array 58 and driver 62 will be described in detail hereinlater.

An image processing terminal 70 for processing an image from the LAN board 36 or assisting in a diagnosis, a video image display monitor 72 for displaying an image (moving image/still image) from the LAN board 36, an image printer 74, and a file server 76 for storing the image data are provided in the diagnosis room 14.

A control signal to each equipment from the system controller 20 can be generated by an instruction from the operator interface 22 in the X-ray control room 12 or from the image processing terminal 70 in the diagnosis room 14.

The fundamental operation of the system controller 20 will now be described. The system controller 20 instructs photographing conditions based on the instruction of the operator to the image pickup controller 24 to control a sequence of the X-ray image pickup system. On the basis of the instruction, the image pickup controller 24 drives the X-ray generator 40, photographing bed 48, and X-ray detector 52, thereby allowing an X-ray image to be photographed. An X-ray image signal which is outputted from the X-ray detector 52 is supplied to the image processor 26 and is subjected to image processing designated by the operator. An image corresponding to the processed image signal is displayed on the monitor 30 and, at the same time, it is stored as fundamental image data into the storage device 28. On the basis of the instruction of the operator, the system controller 20 performs further image processing and displays an image as a processing result and executes a transfer and a preservation of the image data to an apparatus on a network, a display of a video image, a printing on a film, or the like.

The fundamental operation of the system shown in FIG. 1 will now be described in accordance with a flow of the signal. The high voltage generation power supply 44 of the X-ray generator 40 applies a high voltage for generation of X-ray to the X-ray vessel 42 in accordance with a control signal from the image pickup controller 24. Thus, the X-ray vessel 42 generates an X-ray beam. The generated X-ray beam is irradiated to the patient 50 as an object to be examined through the X-ray diaphragm 46. The X-ray diaphragm 46 is controlled by the image pickup controller 24 in accordance with the position where the X-ray beam should be irradiated. That is, the X-ray diaphragm 46 shapes the X-ray beam so as not to perform an unnecessary X-ray irradiation in association with a change in image pickup region.

The X-ray beam generated from the X-ray generator 40 transmits through the object 50 lying on the photographing bed 48 having an X-ray transparency and the photographing bed 48 and enters the X-ray detector 52. The photographing bed 48 is controlled by the image pickup controller 24 so that the X-ray beam can transmit in different portions or directions of the object.

The grid 54 of the X-ray detector 52 reduces the effects of X-ray scattering which is caused when the X-ray beam transmits through the object 50. The image pickup controller 24 vibrates the grid 54 at the time of irradiation of the X-ray so as not to cause any moire interference pattern caused by the relation of the grating ratios of the photodetector array 58 and grid 54. In the scintillator 56, the host material made of the fluorescent material is excited (the X-ray is absorbed) by the X-ray having a high energy and fluorescent light in the visible region is generated by a recombination energy that is generated at that time. The photodetector array 58 arranged adjacently to the scintillator 56 converts the fluorescent light generated by the scintillator 56 into an electric signal. That is, the scintillator 56 converts the X-ray image into a visible light image and the photodetector array converts the visible light image into an electric signal. The X-ray exposure amount monitor 60 detects the visible light (which is proportional to the X-ray amount) transmitted through the photodetector array 58 and supplies information indicative of the detected amount to the image pickup controller 24. On the basis of the X-ray exposure amount information, the image pickup controller 24 controls the high voltage generation power supply 44, thereby shutting off or adjusting the amounts of X-ray. The driver 62 drives the photodetector array 58 under the control of the image pickup controller 24 and reads out the pixel signal from each photodetector. The photodetector array 58 and driver 62 will be described in detail hereinlater.

The image signal which is outputted from the X-ray detector 52 is supplied to the image processor 26 in the X-ray control room 12 from the X-ray room 10. Since noises which are produced in association with the generation of the X-ray are large in the X-ray room 10, it is necessary that a signal transmission path from the X-ray detector 52 to the image processor 26 have a high noise resistance. Specifically speaking, it will be obviously understood that it is desirable to use a digital transmitting system having an advanced error correcting function or to use stranded pair wires shielded by a differential driver or an optical fiber.

As will be explained in detail later, the image processor 26 switches a display format of the image signal on the basis of the instruction from the system controller 20 and, further, executes the correction of the image signal, space filtering, recursive process, and the like in a real-time manner and can execute the gradation process, scattered line correction, DR compressing process, and the like. The image processed by the image processor 26 is displayed on the screen of the monitor 30. Simultaneously with the real-time image process, the image information (fundamental image) which was subjected to only the image correction is preserved in the storage device 28. On the basis of an instruction of the operator, the image information to be stored in the storage 28 is reconstructed so as to satisfy a predetermined standard (for example, Image Save & Carry (IS & C)). After that, the resultant image information is stored in the external storage device 34 and a hard disk or the like in the file server 76.

The apparatus in the X-ray control room 12 is connected to the LAN (or WAN) through the LAN board 36. It will be obviously understood that a plurality of X-ray image pickup systems can be connected to the LAN. The LAN board 36 outputs the image data in accordance with a predetermined protocol (for example, Digital Imaging and Communications in Medicine (DICOM)). By displaying a still image and/or a moving image of a high resolution corresponding to the X-ray image onto a screen of the monitor 72 connected to the LAN or (WAN), a real-time remote diagnosis by a doctor can be performed almost simultaneously with the X-ray photographing.

Figure 2:
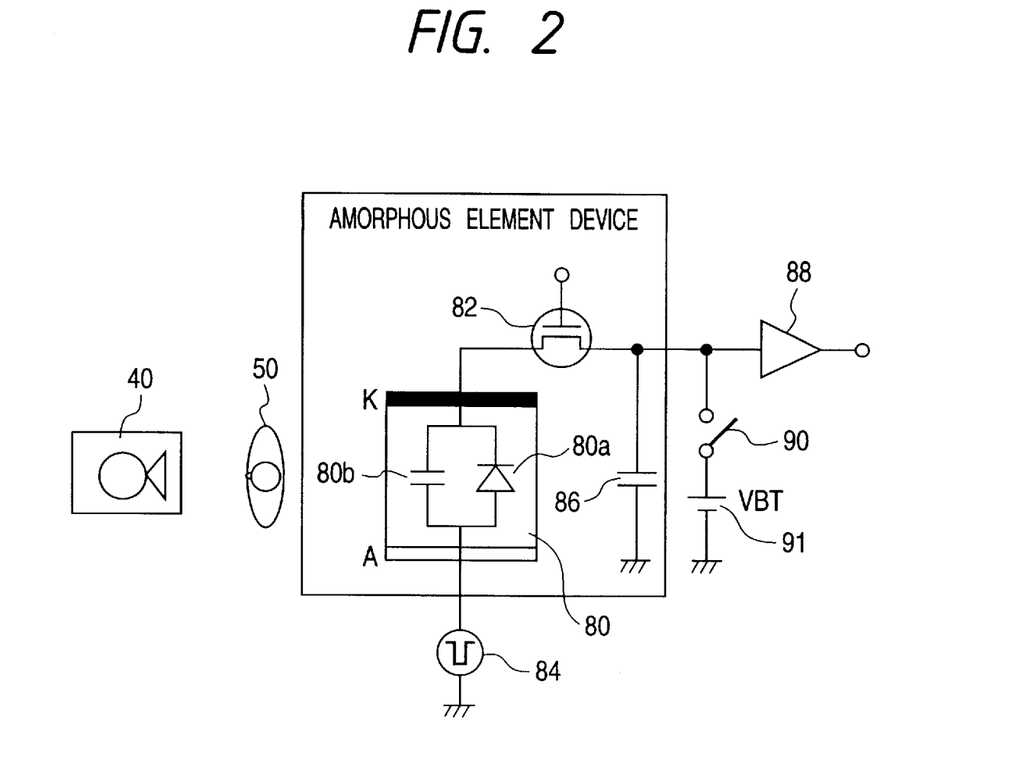
FIG. 2 is equivalent circuit diagram of a construction of a photodetector array 58 in FIG. 1.

FIG. 2 shows an equivalent circuit diagram of a construction of the photodetector array 58. One such device comprises a photodetecting unit 80 and a switching thin film transistor (TFT) 82 for controlling the accumulation and reading of charges and is generally formed by amorphous silicon ($\alpha$-Si) on a glass substrate. The photodetecting unit 80 is further made up of a parallel circuit of a photodiode 80a and a capacitor 80b. As a capacitor 80b, it is possible to use any one of a parasitic capacitance of the photodiode 80a and an additional capacitor to improve a dynamic range of the photodiode 80a. An anode A of the photodetecting unit 80 (photodiode 80a) is connected to a bias power supply 84 through a bias wiring Lb serving as a common electrode. A cathode K of the photodetecting unit 80 (photodiode 80a) is connected to a capacitor 86 and a preamplifier 88 for reading out the charges through the switching TFT 82. An input of the preamplifier 88 is also connected to the ground via a switch 90 for resetting and a VBT battery 91.

First, the switching TFT 82 and resetting switch 90 are temporarily turned on, the capacitor 80b is reset, and the switching TFT 82 and resetting switch 90 are turned off. After that, the X-ray is generated and exposed to the object 50. The scintillator 54 receives the X-ray transmitted through the object 50 and converts the X-ray image into a visible light image. The photodiode 80a is made conductive by the visible light image, thereby discharging the charges from the capacitor 80b. The switching TFT 82 is turned on and the capacitors 80b and 86 are connected in parallel. Thus, information indicative of the discharge amount of the capacitor 80b is also transmitted to the capacitor 86. A voltage of the accumulated charges of the capacitor 86 is amplified by the preamplifier 88 and is outputted to the outside.

Figure 3:
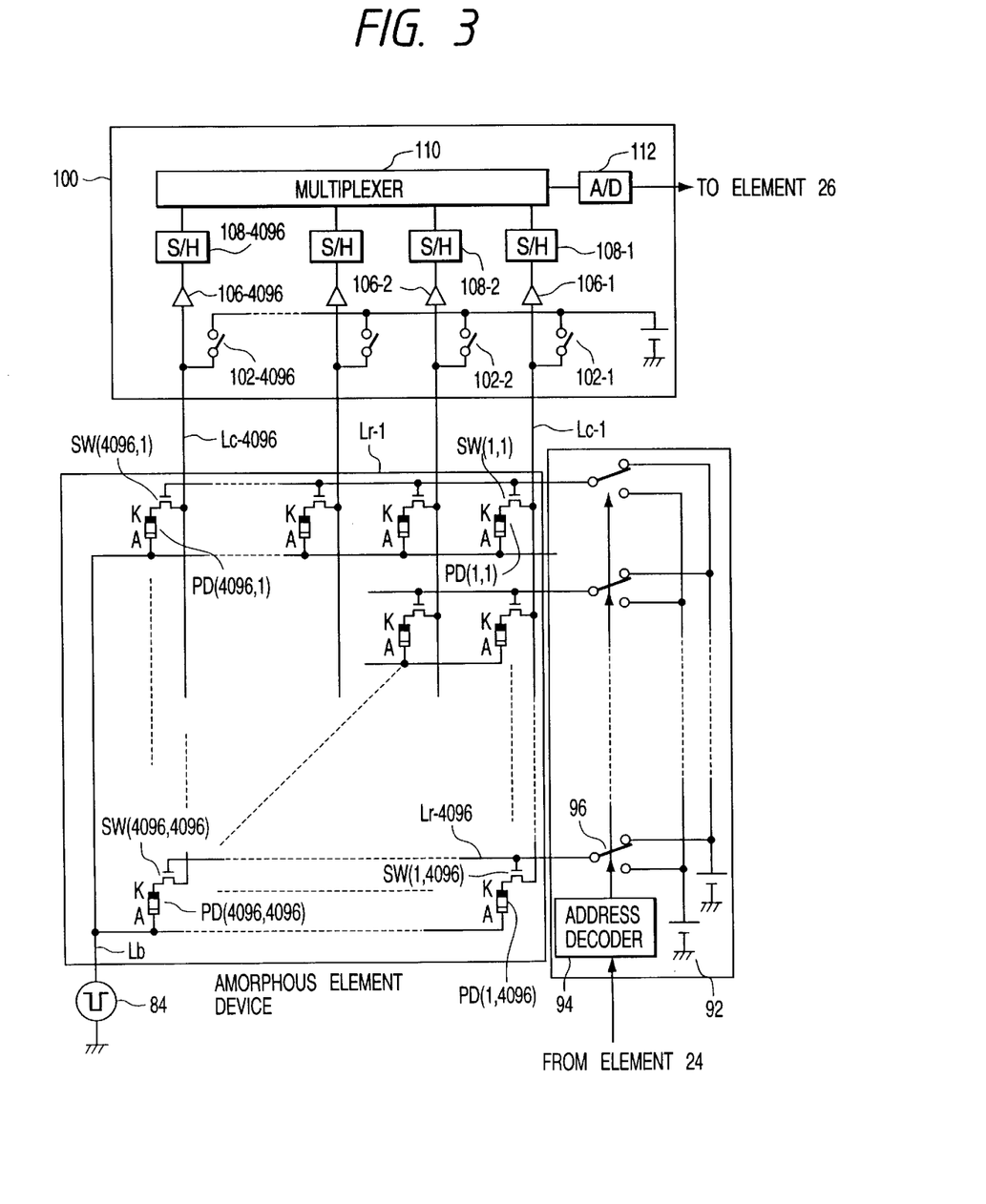
FIG. 3 is an equivalent circuit diagram of a photodetector array 58 comprising photoelectric converting devices in a 2-dimensional array.

The photoelectric converting operation in the case where the photoelectric converting device shown in FIG. 2 is two-dimensionally expanded and constructed will now be described. FIG. 3 is an equivalent circuit diagram of the photodetector array 58 having photoelectric converting devices in a 2-dimensional array. The photodetector array 58 is constructed of about (2000×2000) to (4000×4000) pixels and an array area is equal to about (200 mm×200 mm) to (500 mm×500 mm). In FIG. 3, the photodetector array 58 is constructed of (4096×4096) pixels and an array area equal to (430 mm×430 mm). Therefore, a size of one pixel is equal to about (105×105 $\mu$m). 4096 pixels arranged in the lateral direction are set to one block and 4096 blocks are arranged in the vertical direction, thereby forming a 2-dimensional construction.

In FIG. 3, the photodetector array comprising (4096× 4096) pixels is constructed on one board. However, it will be obviously understood that four photodetector arrays each having (2048×2048) pixels can be also combined. In this case, although the operation to assemble the four photodetector arrays is necessary, since a yield of each photodetector array is improved, there is an advantage such that a whole yield is improved.

As described in FIG. 2, one pixel comprises one photodetecting unit 80 and switching TFT 82. Photoelectric converting devices PD(1, 1) to PD(4096, 4096) correspond to the photodetecting unit 80. Transferring switches SW(1, 1) to SW(4096, 4096) correspond to the switching TFT 82. A cathode K of the photoelectric converting device PD(m, n) is connected to a common column signal line Lc-m for the relevant column through the corresponding switch SW(m, n). For example, the photoelectric converting devices PD(1, 1) to PD(1, 4096) of the first column are connected to the first column signal line Lc-1. All of anodes A of the photoelectric converting devices PD(m, n) are connected to the bias power supply 84 through the bias wiring Lb.

Control terminals of the switches SW(m, n) of the same row are connected to a common row selecting line Lr-n. For example, the switches SW(1, 1) to SW(4096, 1) of the first row are connected to the row selecting line Lr-1. The row selecting lines Lr-1 to Lr-4096 are connected to the image pickup controller 24 through a line selector 92. The line selector 92 is constructed of: an address decoder 94 for decoding the control signal from the image pickup controller 24 and deciding that the signal charges of the photoelectric converting devices of which line should be read out; and 4096 switching devices 96 which are opened or closed in accordance with an output of the address decoder 94. With this construction, the signal charges of the photoelectric converting devices PD(m, n) connected to the switches SW(m, n) connected to an arbitrary line Lr-n can be read out. As a simple construction, the line selector 92 can be also constructed of a shift register such as that used for a liquid crystal display or the like.

The column signal lines Lc-1 to Lc-4096 are connected to a signal read-out circuit 100 which is controlled by the image pickup controller 24. In the signal read-out circuit 100, reference numerals 102-1 to 102-4096 denote switches for resetting the column signal lines Lr-1 to Lr-4096 to a reference potential of a reference power supply 104 for resetting, respectively; 106-1 to 106-4096 denote preamplifiers for amplifying signal potentials from the column signal lines Lr-1 to Lr-4096, respectively; 108-1 to 108-4096 denote sampling and holding (S/H) circuits for sampling and holding outputs of the preamplifiers 106-1 to 106-4096, respectively; 110 an analog multiplexer for multiplexing outputs of the S/H circuits 108-1 to 108-4096 on a time base; and 112 an A/D converter for converting an analog output of the multiplexer 110 into a digital signal. An output of the A/D converter 112 is supplied to the image processor 26.

In the photodetector array shown in FIG. 3, the (4096× 4096) pixels are divided into 4096 columns by the column signal lines Lc-1 to Lc-4096, the signal charges of the 4096 pixels per row are simultaneously read out and are transferred to the analog multiplexer 110 through the column signal lines Lc-1 to Lc-4096, preamplifiers 106-1 to 106-4096, and S/H circuits 108-1 to 108-4096 and are time-base multiplexed by the analog multiplexer 110. The multiplexed signals are sequentially converted into digital signals by the A/D converter 112.

Although FIG. 3 shows a state in which the signal read-out circuit 100 has only one A/D converter 112, actually, the A/D converting operations are simultaneously executed in 4 to 32 systems. This is because it is required to reduce the reading time of the image signal without unnecessarily increasing an analog signal band and an A/D conversion rate. There is an intimate relation between the accumulating time of the signal charges and the A/D converting time. When the A/D conversion is performed at a high speed, a band of the analog circuit is widened and it is difficult to accomplish a desired S/N ratio. Therefore, it is usually required to reduce the reading time of the image signal without unnecessarily raising the A/D converting speed. Although it is sufficient to A/D convert the output of the multiplexer 110 by many A/D converters, an increase in number of A/D converters results in an increase in costs in association with it. Therefore, a proper number of A/D converters are used in consideration of the above point.

Since the irradiating time of the X-ray is equal to about 10 to 500 msec, it is proper to set the fetching time or charge accumulating time of the whole screen to a value on the order of 100 msec or to be slightly shorter. For example, in order to sequentially drive all of the pixels and to fetch the image at a period of 100 msec, an analog signal band is set to about 50 MHz and, when the A/D conversion is performed at a sampling rate of, for example, 10 MHz, at least the A/D converters of four systems are necessary. In the embodiment, the A/D converting operations are simultaneously executed in 16 systems. Outputs of the A/D converters of 16 systems are inputted to memories (FIFOs or the like) (not shown) of 16 systems corresponding to them, respectively. By selecting and switching the memories, the image data corresponding to the continuous scanning lines of one line is transferred to the image processor 26.

Figure 4:
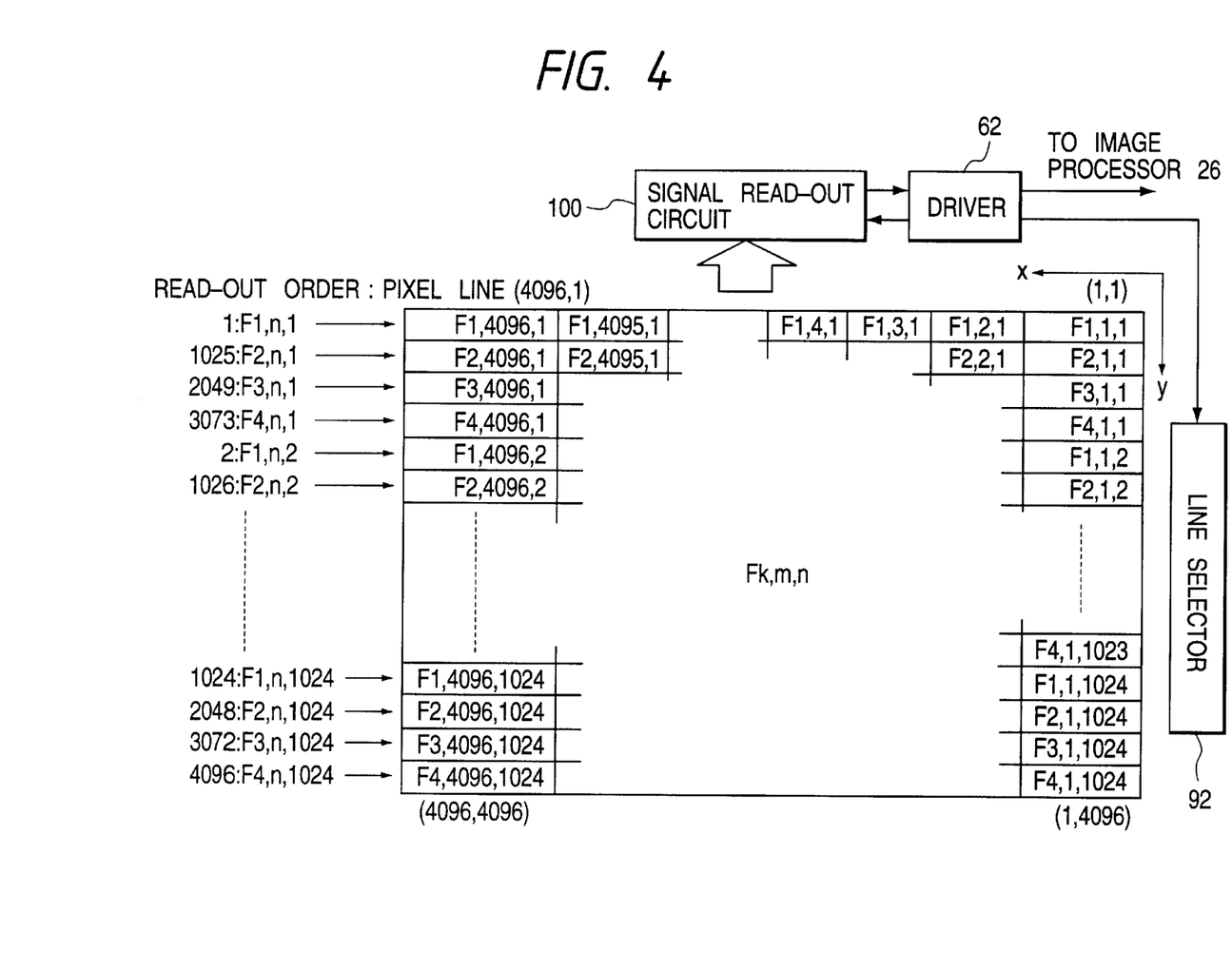
FIG. 4 is a diagram for explaining a driving order of the photodetector array shown in FIG. 3.

The operation from the driving of the photodetector array shown in FIG. 3 to the image display will now be described with reference to FIG. 4. In FIG. 4, reference characters Fk,n,m denotes a pixel, a suffix "k" denotes a number to designate a frame in case of a moving image, "m" indicates a column of the 2-dimensional photodetector array, and "n" shows a row thereof (corresponding to the scanning line), respectively. In the embodiment, k=1 to 4, m=1 to 1024, and n=1 to 4096. The value of k can be also changed to a proper numeral (for example, 1–8) which is not too large. In FIG. 4, it is assumed that the X-ray progress from the front side to the back side of the paper.

In case of the moving image display, the drive order of the 2-dimensional photodetector array in the embodiment is set such that four frames F1, F2, F3, and F4 are repeated. Specifically speaking, in the first frame, the charge signals of the row of F1,n,1, the row of F1,n,2, the row of F1,n,3, ..., and the row of F1,n,1024 are sequentially read out in accordance with this order. In the second frame, the charge signals of the row of F2,n,1, the row of F2,n,2, the row of F2,n,3, ..., and the row of F2,n,1024 are sequentially read out in accordance with this order. In the third frame, the charge signals of the row of F3,n,1, the row of F3,n,2, the row of F3,n,3, ..., and the row of F3,n,1024 are sequentially read out in accordance with this order. In the fourth frame, the charge signals of the row of F4,n,1, the row of F4,n,2, the row of F4,n,3, ..., and the row of F4,n,1024 are sequentially read out in accordance with this order.

In the fifth frame, the same pixels as those of the first frame are sequentially read out in accordance with the same order, namely, the charge signals of the row of F1,n,1, the row of F1,n,2, the row of F1,n,3, ..., and the row of F1,n,1024 are sequentially read out in accordance with this order.

In the sixth frame, the same pixels as those in the second frame are sequentially read out in accordance with the same order, namely, the charge signals of the row of F2,n,1, the row of F2,n,2, the row of F2,n,3, ..., and the row of F2,n,1024 are sequentially read out in accordance with this order.

According to the embodiment as mentioned above, the 2-dimensional photodetector array is divided into four systems and is repetitively operated. The drive order or the read-out scan order are not limited to those in the example shown in FIG. 4. For example, in FIG. 4, when returning from the frame F4 to the frame F1, the pixel lines are Jumped by three lines. To suppress the number of lines to be jumped, for example, by driving and scanning the frames like frames F1, F2, F4, F3, F1, and F2 ..., the line jump width can be suppressed to a maximum of two lines. In the case where the user is anxious about the movement of the center of gravity of the display pixels, by respectively adding the corresponding pixels of F1 and F4 and the corresponding pixels of F2 and F3 and alternately displaying (outputting) the addition results, the movement of the center of gravity of the display pixels can be avoided.

Figure 5:
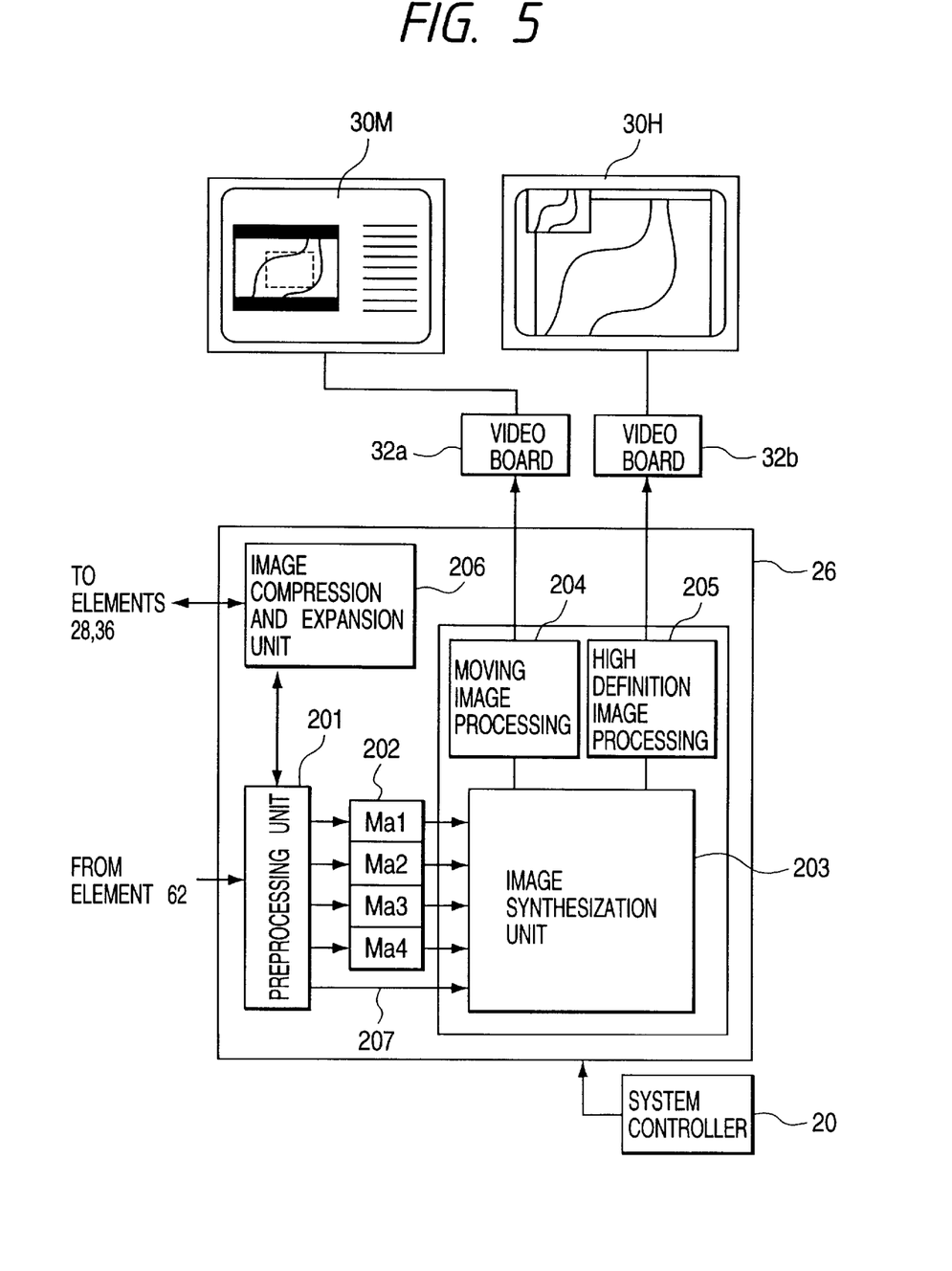
FIG. 5 is a diagram for explaining a construction of an image processor 26.

FIG. 5 is a diagram for explaining a construction of the image processor 26.

The operation of the image processor 26 will now be described with reference to FIG. 5.

The image data outputted from the A/D converter 112 in the driver 62 is inputted to a preprocessing unit 201 and is subjected to correcting processes such as offset correction, gain correction, defect correction, and the like.

The image data processed by the preprocessing unit 201 is supplied to an image compression and expansion unit 206 or a memory 202.

The image compression and expansion unit 206 executes a compressing process (for example, DR compression, lossless compression, or the like) on the image data picked up and supplies the compressed image data to the storage device 28 or LAN board 36 through a bus (not shown).

The compressed image data supplied to the LAN board 36 is transferred to the image processing terminal 70, by which the compressed image is expanded and processes (which will be explained hereinlater) similar to those in the image processor 26 are executed, and the resultant image data can be displayed on the video image display monitor 72.

The compressed image data read out from the storage device 28 can be inputted to the image compression and expansion unit 206 through the bus (not shown). The compressed image data can be also expanded and supplied to the preprocessing unit 201.

The memory 202 is constructed by four frame memories Ma1 to Ma4.

The image data of the frame F1 processed by the preprocessing unit 201 is stored into the memory Ma1.

In the moving image display mode, the image data of the frame F1 is inputted to a moving image processing unit 204 through an image synthesization unit 203 and is subjected to predetermined processes. After that, the processed image data is outputted to a video board 32a in the display controller 32 through the bus (refer to FIG. 1) (not shown in FIG. 5) and is displayed on a screen of a monitor 30M for displaying a moving image.

ID data (for example, photographing conditions, a photographing timing, image processing conditions, an object ID, and the like) of the pickup image is inputted from the system controller 20 to the image synthesization unit 203 through the bus (not shown). The image synthesization unit 203 can synthesize the ID data corresponding to the image data from the driver 62 and can also display the ID data together with the image data on the screen of the monitor 30M for displaying the moving image.

The ID data can be stored in the storage device 28 together with the image data.

In a manner similar to the above, the image data of the frames F2, F3, and F4 is sequentially stored into the memories Ma2, Ma3, and Ma4 and is transferred to the video board 32a and a corresponding image is displayed on the screen of the monitor 30M for displaying the moving image.

When the image of the frame F1 is subsequently fetched, the memory Ma1 is updated and a new image of the frame F1 is displayed on the monitor 30M. In a manner similar to the above, the storage data in the memories Ma2, Ma3, and Ma4 is updated.

In the above description, after the image data has been stored in the memory 202, it is supplied to the image synthesization unit 203. However, the image data can be also directly inputted to the image synthesization unit 203 through a line 207 without passing through the memory 202. In this case, since the time to store into the memory 202 can be reduced, the pickup image can be displayed on the monitor without a delay.

Since the frames Fk (where, k=1 to 4) are matrix images of (4096×1024), they can be also digitally added in the main scanning direction. For example, by adding four pixels in the main scanning line direction, an image is displayed as a square matrix of (1024×1024). This adding process is executed in the image processing unit in the image processor 26 on the basis of an instruction from the system controller 20.

As another display method, a partial area among all pixels of the frames F1 to F4 can be also displayed at a resolution as it is. In this instance, the pixels corresponding to ¼ of the display pixels are sequentially updated. As further another display method, it is also possible to perform an addition averaging process by a matrix of (4×4) from (4096×4096) of all pixels of the frames F1 to F4 and to display a frame image of (1024×1024).

The photographer can shift from the moving image display mode to the high resolution display mode at an arbitrary time point by instructing via the operator interface 22.

In this instance, the image processor 26 reads out the images which have already been stored in the memories Ma1 to Ma4 by the image synthesization unit 203, synthesizes the image data read out from each memory, and forms a frame image of (4096×4096) pixels. The frame image is supplied to a video board 32b through the bus (not shown), thereby allowing a high definition still image to be displayed by a monitor 30H for displaying a still image.

Since the image of (4096×4096) pixels cannot be displayed in a lump in the screen of the monitor 30H for displaying a still image, a part of the image is displayed on the screen of the monitor 30H. In this instance, it is also possible to thin out the pixels of the unnecessary portion from the whole image and to display a whole thinned-out image in a lump or to display the whole image so that it can be scrolled in the vertical and lateral directions.

That is, in the image synthesization unit 203, the image data read out from the memories Ma1 to Ma4 in the memory 202 is synthesized and an image of a high resolution and a high definition is formed in the high resolution display mode. Predetermined processes are executed in a high definition image processing unit 205 and the processed signal is supplied to the video board 32b through the bus (not shown). A high definition still image is displayed on the monitor 30H.

Figure 6:
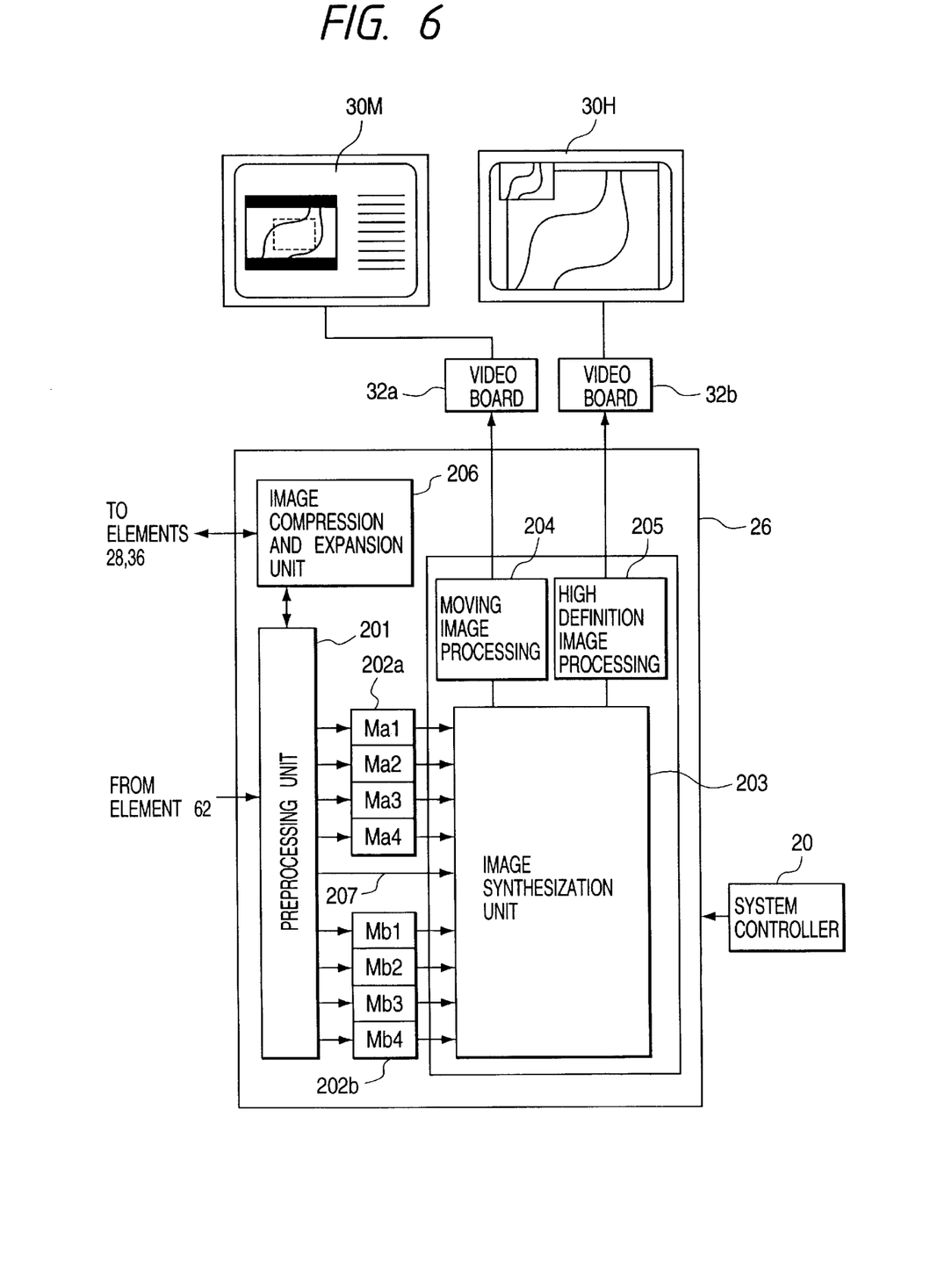
FIG. 6 is a block diagram for explaining another construction of the image processer 26.

FIG. 6 shows a modification example of the image processor 26. As shown in FIG. 6, memories 202a (Ma1 to Ma4) and 202b (Mb1 to Mb4) of two systems are provided in the image processor 26.

In this case, in the moving image display mode, the image data is stored into the memory 202a as mentioned above and the image is displayed by the monitor 30M for displaying a moving image.

When the photographer instructs to fetch a still image (high resolution display mode), the contents in the memories Ma1 to Ma4 are held as they are and the image obtained by thinning out those contents or a partial image is displayed on the monitor 30H for displaying a still image. At the same time, a moving image is newly stored into the memory 202b (Mb1 to Mb4) and the stored contents are displayed on the monitor 30M for displaying a moving image.

Thus, the photographing of a moving image and its display can be continued without being anxious about the time that is required to fetch the still image.

Figure 7A:
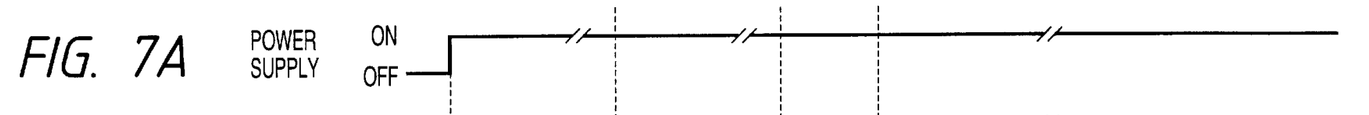
FIGS. 7A, 7B, 7C, 7D, 7E, 7F, 7G, 7H, 7I, and 7J are timing charts showing drive timings of the photodetector array 58.
Figure 7B:
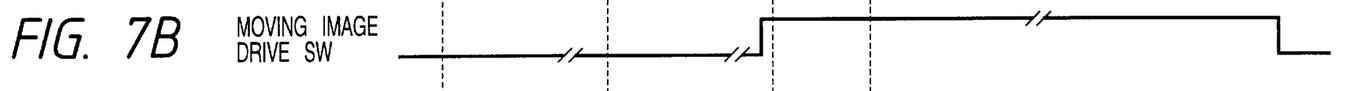
Figure 7C:
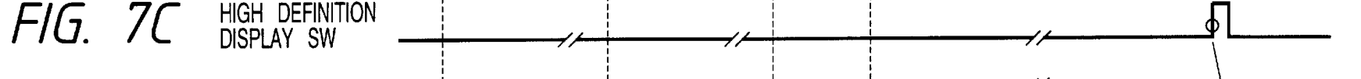
Figures 7D, 7E, 7F, 7G:
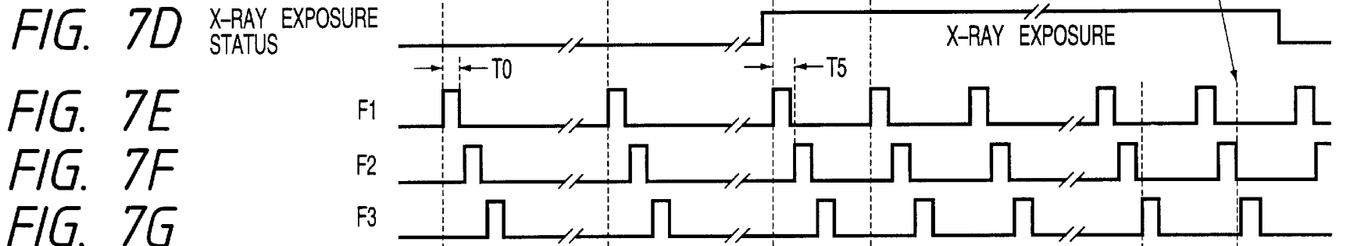
Figure 7H:
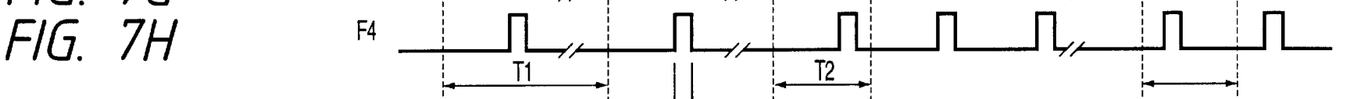
Figure 7I:
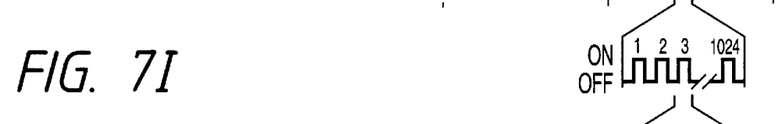
Figure 7J:
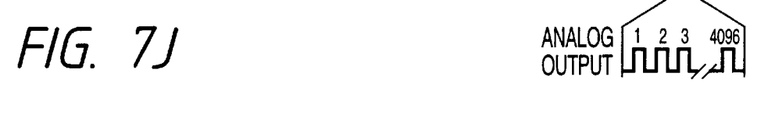

FIGS. 7A to 7J are timing charts showing processing timings of the image processor 26 shown in FIG. 6. FIG. 7A shows an ON state of the power supply. FIG. 7B shows a moving image photographing instruction of the photographer. FIG. 7C shows a high definition image obtaining instruction. FIG. 7D shows an X-ray exposure status. FIGS. 7E to 7H show driving states of sensor regions shown in FIG. 4 and simulatively shows a state where one pulse drives the sensor to fetch the frames F1 to F4. As shown in FIG. 7I, the TFT is turned on/off 1024 times for one column pulse. In association with the on/off operation of one time, 4096 analog outputs are sequentially outputted from the multiplexer 110 as shown in FIG. 7J. In FIG. 7J, it is assumed that an analog output is outputted as 4096 pulse trains for one column pulse. However, actually, since the image signals are read out by 16 systems per column output, 16 pulse signals are simultaneously outputted, so that 256 pulse trains are A/D converted. By dividing the signals into 16 systems and reading out the signals, an operating time T0 of the blank reading and real reading per frame is equal to about 25 msec.

A charge accumulating time of each sensor is equal to a time which is required from the turn-off of the TFT 82 at the time of completion of the resetting operation, namely, at the time of the blank reading to the turn-on of the TFT 82 for subsequently reading out the charges. Therefore, the accumulating time and the time differ every selecting line Lr of each row.

The image fetching and displaying operations using the image processor 26 shown in FIG. 6 will now be described. First, when the power supply is turned on, all of the photodetecting devices PD(n, m) are reset to a reference potential. That is, after the resetting switches 102-1 to 102-4096 were turned on and the column signal lines Lc-1 to Lc-4096 were reset to a voltage VBT of the reset reference power supply 104, the resetting switches 102-1 to 102-4096 are turned off. After that, the bias wiring Lb is set to a predetermined potential, the transferring switches SW(1, 1) to SW(4096, 1) of the first row are turned on, and the photoelectric converting devices PD(1, 1) to PD(4096, 1) are reset by applying an inverse bias VBT thereto. After the elapse of a time enough to reset the photoelectric converting devices PD(1, 1) to PD(4096, 1), the switches SW(1, 1) to SW(4096, 1) are turned off. By again operating the resetting switches 102-1 to 102-4096, the signal lines Lc-1 to Lc-4096 are reset and the photoelectric converting devices PD(1, 5) to PD(4096, 5) of the fifth row are reset by the transferring switches SW(1, 5) to SW(4096, 5). Similarly, the photoelectric converting devices of the ninth row, the thirteenth row, . . . , and the four-thousand ninty-third row are sequentially reset.

In a manner similar to the above, subsequently, the resetting operations are sequentially repeated on every fifth row from the second row, every fifth row from the third row, every fifth row from the fourth row, . . . , thereby resetting all of the pixels.

The above operations are substantially the same as the reading operation of the signal charges for the photodetector array except that there is only a difference such that the signal charges are fetched and the processes after the A/D conversion are executed or not. Although each of the transferring switches SW(1, 1) to SW(4096, 4096) is turned on, the A/D conversion is not performed. This resetting operation is hereinafter called a "blank reading". After that, the blank reading operation is repeated at a 1-frame driving speed T0 every predetermined time interval T1 until the operator instructs to start the photographing.

When the photographing starting instruction is inputted by the photographer, the image pickup controller 24 starts the exposure of the X-ray to the object 50 after waiting for the end of the blank reading operation. In a default, the exposure is started in the moving image display mode. A fundamental driving method in the moving image display mode is substantially the same as that of the blank reading except that the signal charges are fetched, the processes after the A/D conversion are executed, the image data is transferred to the image processor 26, and the image is displayed on the monitor 30. A driving time of the unit of each frame F is equal to T0, a driving start time interval T5 of the continuous frames F is equal to 33 msec, and a repetitive period T2 of the same frame is equal to about 132 msec. After that, this operation is called a "real reading" as compared with the blank reading. In the initial driving, the images are stored into the frame memories Ma1 to Ma4.

When the photographer instructs to fetch the high definition image, the apparatus waits for the end of driving of the frame Fn which is driven at the timing when such an instruction is issued. After that, one image is constructed by combining the previous contents in the memories Ma1 to Ma4 including the frame which was fetched finally. While outputting the image to the monitor 30H, it is recorded to another storage medium (memory, external storage device, or the like) (not shown). At the same time, while storing the moving image into the memories Mb1 to Mb4, the moving image is outputted to the monitor 30M. After that, each time there is an instruction to get a high definition image, applications (for displaying a moving image and for displaying a still image) of the memories Ma1 to Ma4 and memories Mb1 to Mb4 are alternately exchanged like a toggle.

When the photographer stops the photographing of the moving image, the blank reading is again repeated, thereby allowing the photodetector array 58 to enter a standby mode.

Figure 8A:
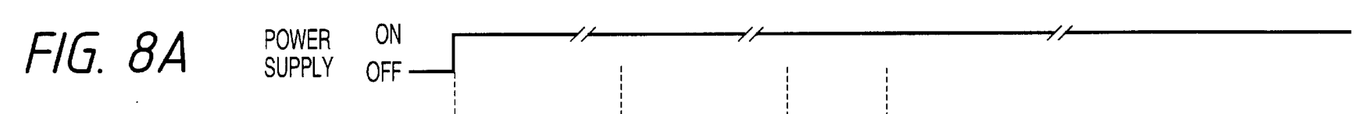
FIGS. 8A, 8B, 8C, 8D, 8E, 8F, 8G and 8H are timing charts showing other drive timings of the photodetector array 58.
Figure 8B:
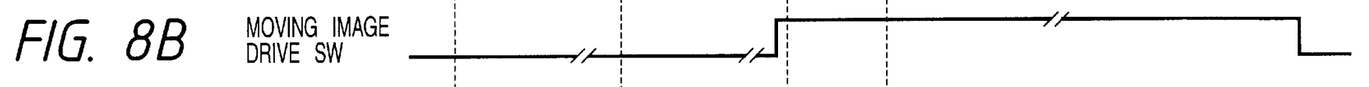
Figures 8C, 8D:
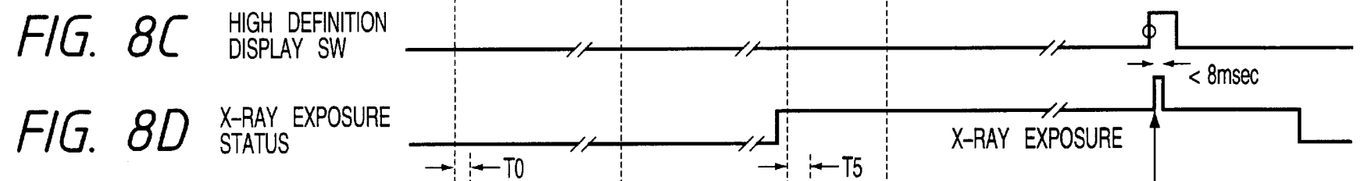
Figure 8E:
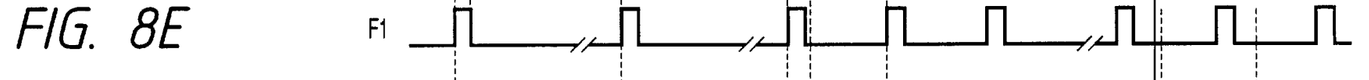
Figure 8F:
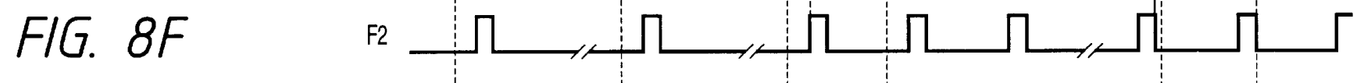
Figure 8G:
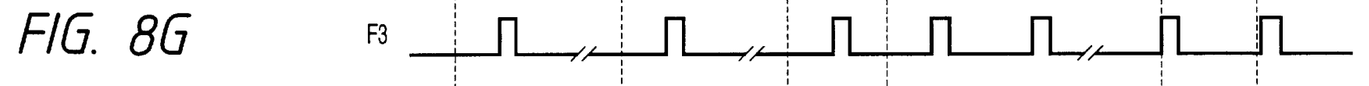
Figure 8H:
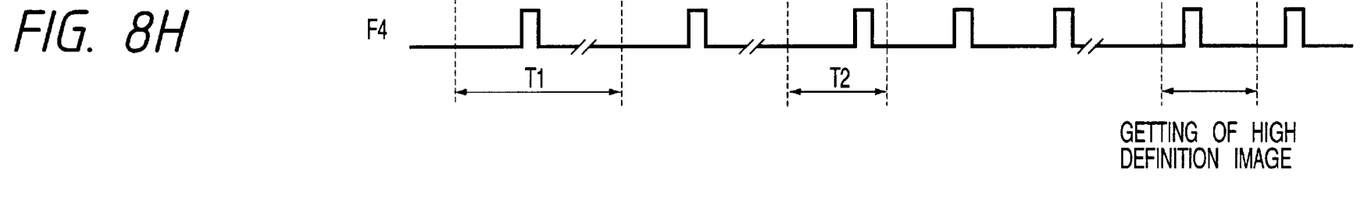

FIGS. 8A to 8H show timing charts for another method of obtaining an image in the high resolution display mode. FIG. 8A shows an ON state of the power supply. FIG. 8B shows a moving image photographing instruction of the photographer. FIG. 8C shows a high definition image obtaining instruction. FIG. 8D shows an X-ray exposure status. FIGS. 8E to 8H show driving states of the sensor regions shown in FIG. 4 and simulatively show a state where one pulse drives the sensor in order to fetch the frames F1 to F4. T0 is equal to 25 msec, T1 indicates a predetermined time interval, and T2 is equal to 132 msec.

Although the timings are fundamentally the same as those in FIGS. 7A to 7J, they will be briefly explained. When the power supply is turned on, all of the photodetecting devices PD(1, 1) to PD(4096, 4096) are reset to the reference potential. When the instruction to start the photographing is received from the photographer, the image pickup controller 24 waits for the end of the blank reading operation and starts the exposure of the X-ray to the object 50. In a default, the exposure is started in the moving image display mode and the real reading is started.

When the photographer instructs to fetch the high definition image, the apparatus waits for the end of driving of the frame Fn which is driven at the timing to issue such an instruction and exposes the X-ray of the amount which has been preset for the high definition image for a period of time until the driving of the next frame Fn+1 is started. After the end of the exposure, the frame (F2 here) just after the exposure is first read. The read image data is stored into the frame memory Ma2 and, at the same time, a simple image process is performed and the image is displayed on the monitor 30H. Thus, the operator can confirm the X-ray image of a high exposure amount before all of the pixels are fetched. In parallel with the display, the image data of the remaining three frames are stored into the memories Ma1 to Ma4 and are synthesized to one image. The synthesized image is outputted to the monitor 30H. At the same time, while storing the moving image into the frame memories Mb1 to Mb4, the moving image is outputted to the monitor 30M. After that, each time there is the instruction to obtain the high definition image, the applications of the memories Ma1 to Ma4 and memories Mb1 to Mb4 are alternately exchanged like a toggle.

When the photographer stops the photographing of the moving image, the blank reading is again repeated, thereby allowing the photodetector array 58 to enter a standby mode.

In case of driving as shown in FIGS. 8A to 8H, both of the high definition image and the moving image can be displayed by merely changing the control of the X-ray generator instead of changing the driving method of the photodetector array 58.

Although the embodiment using the whole sensor area has been described above, the use of the whole sensor area is not a necessary condition. It is also possible to drive so as to read out the signals of only the necessary area.

In other words, the foregoing description of embodiments has been given for illustrative purposes only and not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. An image processing apparatus comprising:
   a) irradiating means for irradiating an energetic ray onto an object to be examined;
   b) image pickup means including a plurality of pixels arranged in a two-dimensional form, said image pickup means for converting an image corresponding to the energetic ray transmitted through the object into an optical image and picking up or acquiring image information corresponding to the optical image;
   c) driving means for scanning the plurality of pixels in an n-row (n is a natural number) interlaced scan; and
   d) image processing means for performing image processing on the acquired image information, wherein
   said image processing means includes a first mode for performing moving image processing using image data of a plurality of frames obtained from the scanning of said driving means to obtain moving image data and a second mode for synthesizing the moving image data obtained in the first mode and performing still image processing using the synthesized moving image data obtained from the synthesizing, and
   said image processing means performs the still image processing in parallel with the moving image processing.

2. An apparatus according to claim 1, wherein the energetic ray is an X-ray.

3. An apparatus according to claim 1, wherein said image pickup means comprises amorphous silicon sensors.

4. An apparatus according to claim 1, wherein said image processing means includes storage means for storing the moving image data to be synthesized.

5. An apparatus according to claim 1, wherein
   said image processing means includes first and second storage means for storing the image data of the plurality of frames,
   said image processing means stores the image data of the plurality of frames obtained from the scanning of said driving means in the second storage means, during synthesis of the image data of the plurality of frames stored in the first storage means, and
   performs the moving image processing using the image data of the plurality of frames stored in the second storage means.

6. An apparatus according to claim 1, further comprising
   control means for controlling said image processing means so that the still image processing is performed at a predetermined timing, and
   change means for changing an irradiation amount of the energetic ray irradiated by said irradiating means according to said control means.

7. An apparatus according to claim 1, wherein said image processing means adds image data of each of the plurality of frames and performs the moving image processing using the added image data.

8. An apparatus according to claim 1, further comprising compressing means for compressing the image data.

9. An apparatus according to claim 8, wherein said compressing means executes a loss-less compression process.

10. An apparatus according to claim 8, further comprising transmitting means for transmitting the image data compressed by said compressing means to an external unit.

11. An apparatus according to claim 8, further comprising recording means for recording the image data compressed by said compressing means on a recording medium.

12. An image processing apparatus comprising:
a) image pickup means including a plurality of pixels arranged in a two-dimensional form, for pickup up image information of an object;
b) driving means for scanning said plurality of pixels in an n-row (n is a natural number) interlaced scan; and
c) image processing means for performing image processing on the acquired image information, wherein said image processing means includes a first mode for performing moving image processing using image data of a plurality of frames obtained from the scanning of said driving means to obtain moving image data and a second mode for synthesizing the moving image data obtained in the first mode and performing still image processing using the synthesized moving image data obtained from the synthesizing, and
said image processing means performs the still image processing in parallel with the moving image processing.

13. An apparatus according to claim 12, wherein said image pickup means converts an X-ray which was irradiated from an X-ray vessel and transmitted through an object to be examined into an optical image and picks up or acquires data corresponding to the optical image.

14. An apparatus according to claim 12, wherein said image processing means includes storage means for storing the image data to be synthesized.

15. An apparatus according to claim 12, wherein
said image processing means includes first and second storage means for storing image data of the plurality of frames,
said image processing means stores the image data of the plurality of frames obtained from the scanning of said driving means in the second storage means, during synthesis of the image data of the plurality of frames stored in the first storage means, and
performs the moving image processing using the image data of the plurality of frames stored in the second storage means.

16. An apparatus according to claim 12, wherein said image processing means adds image data of each of the plurality of frames and performs the moving image processing using the added image data.

17. An apparatus according to claim 12, further comprising compressing means for compressing the image signal.

18. An apparatus according to claim 17, further comprising transmitting means for transmitting the image data compressed by said compressing means to an an external unit.

19. An apparatus according to claim 17, further comprising recording means for recording the image data compressed by said compressing means in a recording medium.

20. An apparatus according to claim 12, wherein said image processing means adds image data of each of the plurality of frames and performs the first mode using the added image data.

21. An image processing method comprising:
a scanning step of scanning a plurality of pixels arranged in a two-dimensional form using image pickup means in order to pick up or acquire image information from an object; and
an image processing step for performing image processing on the acquired image information, wherein
said image processing step includes a first mode for performing moving image processing using image data of a plurality of frames obtained from the scanning in said scanning step to obtain moving image data and a second mode for synthesizing the moving image data obtained in the first mode and performing still image processing using the synthesized moving image data obtained from the synthesizing, and
said image processing step performs the still image processing in parallel with the moving image processing.

22. An image processing apparatus comprising:
a) scanning means for scanning image information in a n-row (n is a natural number) interlaced scan; and
b) image processing means for performing image processing, wherein said image processing includes a first mode for performing an image processing using image data of a plurality of frames obtained from the scanning of said scanning means to obtain consecutive image data and a second mode for synthesizing the consecutive image data obtained in the first mode and said image processing means performs the second mode in parallel with the first mode.

23. An apparatus according to claim 22, further comprising image pickup means including a plurality of pixels arranged in a two-dimensional form for picking up said image information.

24. An apparatus according to claim 22, wherein said image processing means includes storage means or storing the image information obtained from said image pickup means and performs the first and second modes using the image information stored in said storage means.

25. An apparatus according to claim 22, wherein
said image processing means includes first and second storage means for storing image data of the plurality of frames,
said image processing means stores the image data of the plurality of frames obtained from the scanning of said scanning means in the second storage means, during synthesis of the image data of the plurality of frames stored in the first storage means, and
the first mode is performed using the image data of the plurality of frames stored in the second storage means.

26. An apparatus according to claim 22, wherein said image processing means adds image data of each of the plurality of frames and performs the first mode using the added image data.

27. An apparatus according to claim 22, further comprising interface means for inputting image information transferred on a network,
wherein said first and second processing means perform the processings by using the image information input from the network, respectively.

28. An apparatus according to claim 22, further comprising image pickup means including a plurality of pixels arranged in a two-dimensional form, said image pickup means for converting an image corresponding to an energetic ray transmitted through the object into an optical image and picking up or acquiring image information corresponding to the optical image.

29. An apparatus according to claim 28, further comprising irradiating means for irradiating the energetic ray onto the object.

30. An image processing apparatus comprising:
   a) first processing means for performing a processing using image data of a plurality of frames to obtain consecutive image data,
   b) second processing means for synthesizing the consecutive image data obtained in the first processing means in parallel with processing of said first processing means.

31. An apparatus according to claim 30, further comprising:
   first and second storage means for storing image data of the plurality of frames; and
   means for storing the image data of the plurality of frames obtained from the scanning of said driving means in said second storage means, during synthesis of the image data of the plurality of frames stored in said first storage means,
   wherein the first mode is performed using the image data of the plurality of frames stored in the second storage means.

32. An apparatus accordin to claim 30, further comprising image pickup means including a plurality of pixels arranged in a two-dimensional form, said image pickup means for converting an image corresponding to an energetic ray transmitted through the object into an optical image and picking up or acquiring image information corresponding to the optical image.

33. An apparatus according to claim 32, further comprising irradiating means for irradiating the energetic ray onto the object.

34. An apparatus according to claim 30, further comprising image pickup means including a plurality of pixels arranged in a two-dimensional form for picking up image information.

35. An apparatus according to claim 34, further comprising storage means for storing the image information obtained from said image pickup means, wherein said first and second processing means perform the processings by using the image information stored in said storage means, respectively.

36. An apparatus according to claim 35, further comprising interface means for controlling to output the image information to a network,
   wherein said interface means outputs the image information obtained from said image pickup means, according to a predetermined protocol.

37. An image processing apparatus comprising:
   a) motion image processing means, said means displaying a motion image by using obtained image information; and
   b) still image processing means for displaying a still image by using the image information used for the display of the motion image, at a predetermined timing during the display of the motion image in parallel with the processing of said motion image processing means.

38. An image processing apparatus according to claim 37, further comprising input means for instructing to display the still image during the display of the motion image,
   wherein said still image processing means operates according to the instruction of said input means.

39. An apparatus according to claim 37, further comprising image pickup means including a plurality of pixels arranged in a two-dimensional form, said image pickup means for converting an image corresponding to an energetic ray transmitted through the object into an optical image and picking up or acquiring image information corresponding to the optical image.

40. An apparatus according to claim 39, further comprising irradiating means for irradiating the energetic ray onto the object.

41. An image processing apparatus comprising:
   a) interface means for inputting image information transferred on a network;
   b) motion image processing means for displaying a motion image by using image information obtained from said interface means; and
   c) still image processing means for displaying a still image by using the image information used for the display of the motion image, at a predetermined timing during the display of the motion image in parallel with the processing of said motion image processing means.

42. An image processing apparatus comprising:
   a) interface means for inputting image information transferred on a network and controlling to output image information to the network;
   b) image pickup means for picking up image information of an object;
   c) motion image processing means for displaying a motion image by using the image information obtained from said image pickup means or the image information obtained from said interface means; and
   d) still image processing means for displaying a still image by using the image information used for the display of the motion image, at a predetermined timing during the display of the motion image in parallel with the processing of said motion image processing means.

43. An image processing apparatus according to claim 42, further comprising input means for instructing to display the still image during the display of the motion image,
   wherein said still image processing means operates according to the instruction of said input means.

44. An image processing apparatus according to claim 42, wherein said interface means outputs the image information obtained from said image pickup means, according to a predetermined standard.

45. An image processing apparatus according to claim 42, further comprising input means for instructing to display the still image during the display of the motion image,
   wherein said still image processing means operates according to the instruction of said input means.

\* \* \* \* \*

UNITED STATES PATENT AND TRADEMARK OFFICE
CERTIFICATE OF CORRECTION

PATENT NO.   : 6,084,939
DATED        : July 4, 2000
INVENTOR(S)  : Toshikazu Tamura It is certified that error appears in the above-identified patent and that said Letters Patent is hereby corrected as shown below:

Title page [57] Abstract:
Line 2, "a" should read --an--.

Column 1:
Line 57, "interlaced." should read --interlaced scan.--

Column 2:
Line 43, "scan" should read --scan;--.

Column 3:
Line 1, "is" should read --is an--.

Column 4:
Line 16, "is" should read --are--;
Line 37, "device" should read --device,--; and
Line 38, "silicon" should read --silicon,--.

Column 5:
Line 63, "amounts" should read --amount--.

Column 6:
Line 23, "storage 28" should read --storage device 28--.

Column 7:
Line 34, "correspond" should read --corresponds--.

Column 8:
Line 56, "denotes" should read --denote--; and
Line 63, "progress" should read --progresses--.

Column 9:
Line 33, "Jumped" should read --jumped--.

Column 10:
Line 7, "into" should read --in--; and
Line 29, "into" should read --in--.

UNITED STATES PATENT AND TRADEMARK OFFICE
CERTIFICATE OF CORRECTION

PATENT NO.  : 6,084,939
DATED       : July 4, 2000
INVENTOR(S) : Toshikazu Tamura It is certified that error appears in the above-identified patent and that said Letters Patent is hereby corrected as shown below:

Column 13:
Line 58, "of" (second occurrence) should be deleted.

Column 14:
Line 54, "comprising" should read --comprising:--; and
Line 57, "timing, and" should read --timing; and--.

Column 15:
Line 17, "said" should read --¶ said--.

Column 16:
Line 35, "or" should read --for--.

Column 17:
Line 45, "claim 35," should read --claim 34,--.

Signed and Sealed this

Fourteenth Day of August, 2001

*Attest:*

*Attesting Officer*

NICHOLAS P. GODICI
*Acting Director of the United States Patent and Trademark Office*